US010615738B2

(12) United States Patent
Sgarrella

(10) Patent No.: US 10,615,738 B2
(45) Date of Patent: Apr. 7, 2020

(54) PHOTOVOLTAIC SOLAR ARRAY SUPPORT STRUCTURE

(71) Applicant: Barry Sgarrella, Novato, CA (US)

(72) Inventor: Barry Sgarrella, Novato, CA (US)

( * ) Notice: Subject to any disclaimer, the term of this patent is extended or adjusted under 35 U.S.C. 154(b) by 0 days.

(21) Appl. No.: 15/949,354

(22) Filed: Apr. 10, 2018

(65) Prior Publication Data

US 2019/0312543 A1  Oct. 10, 2019

(51) Int. Cl.
*H02S 20/10* (2014.01)
*E02D 5/24* (2006.01)
*E02D 5/22* (2006.01)

(52) U.S. Cl.
CPC ........... *H02S 20/10* (2014.12); *E02D 5/223* (2013.01); *E02D 5/24* (2013.01)

(58) Field of Classification Search
CPC . E02D 5/24; E02D 5/223; H02S 20/10; H02S 20/30; H02S 20/32; H02S 20/00; F24S 25/617; F24S 25/61; F24S 25/12; F24S 25/70; F24S 25/16; Y02E 10/47; Y02E 10/50
USPC ............ 52/173.3, 648.1, 650.3, 653.1, 655.1
See application file for complete search history.

(56) References Cited

U.S. PATENT DOCUMENTS

| 5,143,556 | A * | 9/1992 | Matlin | H02S 20/10 136/244 |
| 7,857,269 | B2 * | 12/2010 | Plaisted | F16L 3/127 248/237 |
| 8,177,180 | B2 * | 5/2012 | Plaisted | F16L 3/127 248/237 |
| 8,273,978 | B2 * | 9/2012 | Thompson | H02S 20/00 136/244 |
| 8,381,464 | B2 * | 2/2013 | Conger | F24S 25/50 52/173.3 |
| 8,590,527 | B2 * | 11/2013 | Luconi | F24S 25/61 126/596 |
| 8,704,082 | B2 * | 4/2014 | Angoli | H02S 20/32 136/246 |
| 8,981,201 | B2 * | 3/2015 | Sinclair | H01L 31/042 136/243 |
| 9,188,366 | B2 * | 11/2015 | Thurner | F24S 25/12 |
| 9,553,543 | B2 * | 1/2017 | Kitano | H02S 20/00 |

(Continued)

FOREIGN PATENT DOCUMENTS

| EP | 2388829 A1 * | 11/2011 | ............ H02S 30/20 |
| FR | 2942485 A1 * | 8/2010 | ............ E04H 6/025 |

(Continued)

*Primary Examiner* — Patrick D Hawn
(74) *Attorney, Agent, or Firm* — Mark S. Hubert

(57) ABSTRACT

A photovoltaic solar panel array support structure that has a negligible footprint and that may be adjustably sized in the future to accommodate an increase or decrease of the number of solar panel arrays. It is installed at a substantial elevation above ground level so as to allow unhampered, ongoing farming activities in the area directly below the solar panel array, including the use of large mechanized farm equipment. The photovoltaic solar panel array support structure utilizes a series of vertical pilings that support a pre-fabricated unitary segment platform upon which a solar panel system may be mounted and then lifted atop of the pilings as a single assembly. It is intended for erection and operation in locations where large-scale ground mounted solar panel arrays are not feasible.

14 Claims, 6 Drawing Sheets

(56) References Cited

U.S. PATENT DOCUMENTS

| | | | | |
|---|---|---|---|---|
| 10,003,298 B2* | 6/2018 | Grushkowitz | | H02S 20/32 |
| 10,097,134 B2* | 10/2018 | Molina | | H02S 20/32 |
| 10,404,206 B2* | 9/2019 | Chen | | H02S 20/32 |
| 2010/0313500 A1* | 12/2010 | Beck | | F24S 25/12 |
| | | | | 52/173.3 |
| 2011/0049322 A1* | 3/2011 | Pham | | H02S 20/00 |
| | | | | 248/246.07 |
| 2011/0173900 A1* | 7/2011 | Plaisted | | F16L 3/127 |
| | | | | 52/97 |
| 2011/0290305 A1* | 12/2011 | Hoffmann | | H02S 20/23 |
| | | | | 136/251 |
| 2012/0211059 A1* | 8/2012 | Tomaso | | H02S 20/10 |
| | | | | 136/251 |
| 2013/0019921 A1* | 1/2013 | Au | | F24S 30/425 |
| | | | | 136/246 |
| 2013/0092215 A1* | 4/2013 | Schroeder | | F24S 25/12 |
| | | | | 136/251 |
| 2013/0160816 A1* | 6/2013 | Barton | | H02S 20/32 |
| | | | | 136/246 |
| 2014/0008312 A1* | 1/2014 | Durney | | F24S 25/65 |
| | | | | 211/26 |
| 2014/0215953 A1* | 8/2014 | Sawaki | | F24S 25/617 |
| | | | | 52/653.1 |
| 2014/0261642 A1* | 9/2014 | Beck | | H02S 20/23 |
| | | | | 136/251 |
| 2015/0034575 A1* | 2/2015 | Warpup | | H02S 20/10 |
| | | | | 211/41.1 |
| 2015/0052834 A1* | 2/2015 | Gies | | H02S 20/30 |
| | | | | 52/173.3 |
| 2015/0144580 A1* | 5/2015 | Kitano | | H02S 20/00 |
| | | | | 211/41.17 |
| 2015/0381106 A1* | 12/2015 | Fujikawa | | H02S 20/00 |
| | | | | 136/251 |
| 2016/0013750 A1* | 1/2016 | Durney | | F24S 25/65 |
| | | | | 211/41.1 |
| 2018/0135269 A1* | 5/2018 | Reusing | | E02D 5/223 |
| 2019/0158013 A1* | 5/2019 | Boguess | | H02S 30/10 |

FOREIGN PATENT DOCUMENTS

| | | | | | |
|---|---|---|---|---|---|
| JP | | 2013249616 A | * | 12/2013 | F24S 25/70 |
| JP | | 2014025339 A | * | 2/2014 | E04D 13/002 |
| JP | | 2014077319 A | * | 5/2014 | F24S 25/12 |
| JP | | 2015127501 A | * | 7/2015 | F24S 25/12 |

* cited by examiner

DETAIL C
SCALE 1 : 8

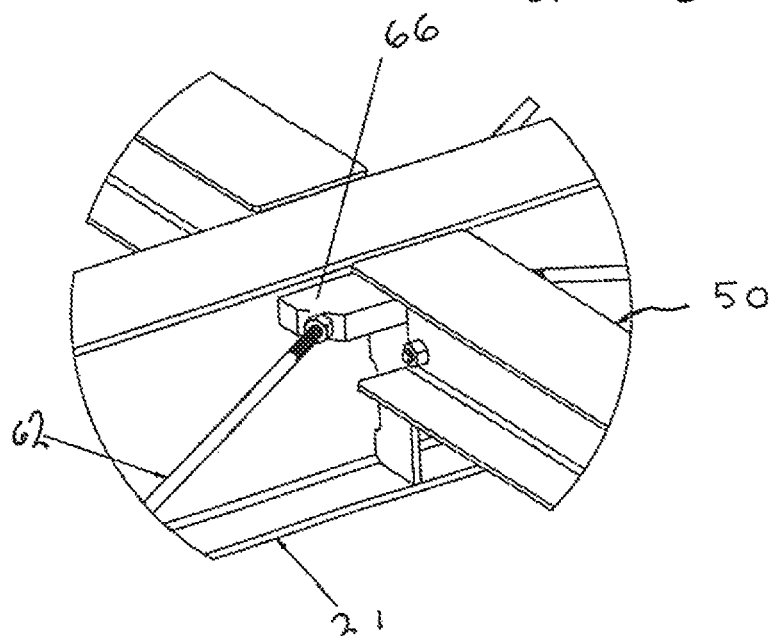
FIG 10 DETAIL C
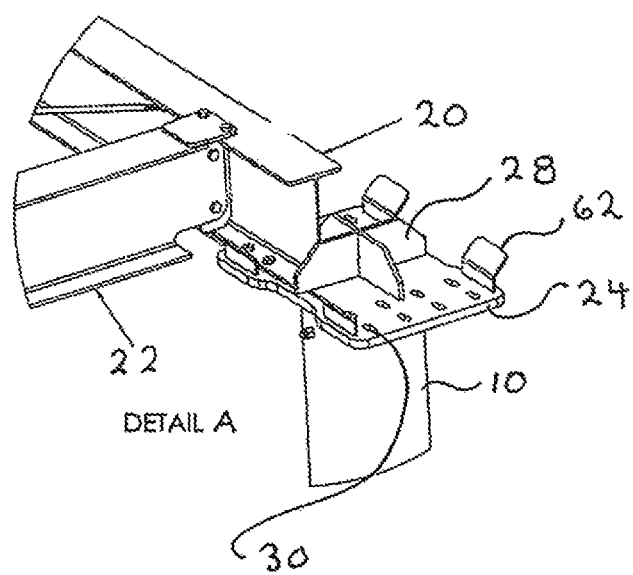
FIG 5
DETAIL A

PHOTOVOLTAIC SOLAR ARRAY SUPPORT STRUCTURE

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to electric power generation, and more particularly to photovoltaic cell array support structures.

BACKGROUND

Photovoltaic cells (solar panels) have come into widespread usage across the US, especially on the heels of government and utility tax incentives and rebates. With cost no longer a factor, the reality of real estate or space often becomes a deciding factor in their use. Since the majority of solar panels range from 14% to 16% efficiency rating, (with a maximum of about 22%) there is a large number of solar panels and a massive amount of planar surface area that is necessary to generate a substantial amount of electricity. In the way of an example, a typical single solar panel occupies 17.6 square feet and has a maximum output between 400 and 435 watts. Taking daylight into consideration the average daily output per solar panel is about 1 kWh. The average home in the US uses about 1,000 kWh of electricity per month. Thus, it takes about 600 sq. feet of solar panel surface to power a house. With their supporting structures, this is about all most homes can accommodate on their roofs.

The future of practical electrical generation with solar panels is in large arrays. This means large, planar, spatial requirements. Rooftops and building walls present a plethora of problems including poor aesthetics, high reflection, poor light transmission below (due to the tight cropping of solar panels), hazardous rain shedding, loss of visibility and the safety of those below.

Since ground level real estate is the most expensive, (especially in urban areas) and is also susceptible to flooding and vandalism, logic dictates that these solar arrays be located in rural locations and be elevated to allow the continued use of the land below.

Henceforth, a non-intrusive support structure for large scale photovoltaic arrays with a non-intrusive method of installation that avoids all of the aforementioned pitfalls of the prior art, would fulfill a long-felt need in the solar energy industry. This new invention utilizes and combines known and new technologies in a unique and novel configuration that accomplishes this.

BRIEF SUMMARY

In accordance with various embodiments, a photovoltaic solar panel array support structure that may be quickly erected so as to allow a prefabricated solitary unit large scale solar panel array (a segment) to be installed at an elevated height thereon, is provided.

In one aspect, a photovoltaic solar panel array support structure that has a negligible footprint and that may be adjustably sized in the future to accommodate an increase or decrease of the number of solar panels.

In another aspect, a photovoltaic solar panel array support structure is provided, capable of allowing unhampered, ongoing farming activities in the area directly below the solar panel array, including the use of large mechanized farm equipment.

In yet another aspect, a photovoltaic solar panel array support structure is provided capable of erection and operation in locations where large-scale ground mounted solar panel arrays are not feasible.

In yet another aspect, a photovoltaic solar panel array support structure that supports the solar panels and motorized equipment for the movement of the solar panels in a configuration that allows the passage of ample sunlight to the ground beneath the solar panel array for agricultural purposes.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 5 is a perspective close up view of the inside corner of a segment platform;

FIG. 10 is a perspective view of a stiffening spar connected to a running spar;

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The present invention relates to a novel design for a photovoltaic solar panel array support structure to be used on agricultural lands so as to support large-scale solar panel arrays above the farmland at a distance elevated enough to allow unhampered passage and use of sizeable machinery below. The large scale solar panel array operates to allow enough sunlight and rain to pass through and by the array for conducting efficient agricultural activities directly beneath, and is the subject of a related patent.

Figure 1:
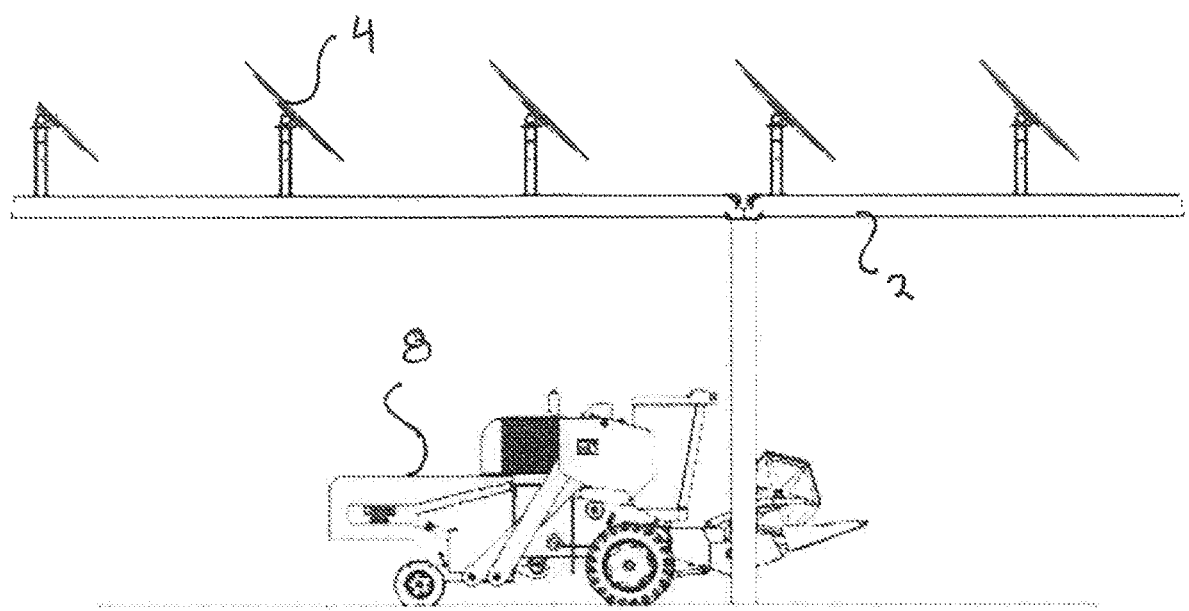
FIG. 1 is a partial side view of a typical installation of the photovoltaic solar panel array support structure ("structure") with a solar panel array affixed thereto.

Looking at FIG. 1 a typical installation of the photovoltaic solar panel array support structure ("structure") 2 with a solar panel array 4 affixed thereto can be seen in its intended environment, an agricultural field 6. As can be seen the scale of the structure is such that large farming equipment 8 can pass underneath.

Figure 2:
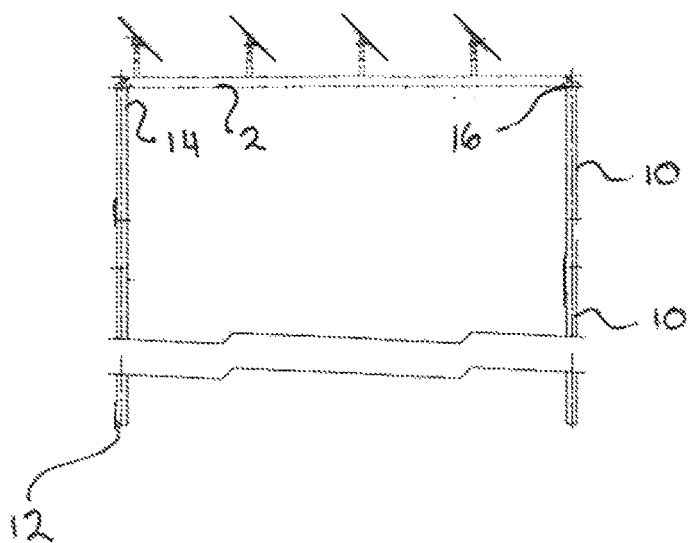
FIG. 2 is a side view of the photovoltaic solar panel system using the structure.

As can be seen in FIG. 2, the structure 2 is made of a series of vertical pilings 10 arranged at the four exterior corners of its rectangular footprint, with the pilings generally made of a round or rectangular cross-sectional pipe/tubing. Square or octagonal concrete or fiberglass pilings may also be used. The pilings 10 have distal ends 12 anchored into the ground in a conventional manner, at a depth generally greater that the height of the exposed piling 10. In the preferred embodiments, the embedded depth will be approximately 25.5 feet and the exposed height will be 18 feet. These embedment depths and exposed lengths will vary as a function of soil conditions and/or equipment height clearances. These pilings 10 have proximal upper ends 14 that are hollow to accept the insertion of matingly engagable piling caps 16 at the exterior corners of the segment platform 18. Although disclosed with a series of four, the piling arrangement may be expanded so as to be 4 plus an additional 2 pilings for each additional segment to be added.

It is to be noted that although the segment platform 18 has a rectangular footprint, but since the ends of the exterior running spars 22 and the boundary beams 20 meet near or adjacent the ends of the boundary beams, there is an open exterior corner to the platform. The four open corners of the segment platform 18 occur at the boundary beam ends. However, in its rectangular configuration it has there are 8 interior corners formed between the two exterior running spars 22 and the two boundary beams. These interior corners occur in pairs and are separated by the thickness of the exterior running spars 22.

The segment platform 18 (FIG. 3) is the planar rectangular structure upon which the solar panel array 4 is affixed to and extends vertically upward from. The segment platform 18 is made of a parallel pair of linear boundary beams 20, a series of parallel exterior and interior running spars (linear members) 21 and 22 connected perpendicularly between the boundary beams 20, a series of stiffening spars 50 connected between the exterior and interior running spars 21 and 22, and a set of diagonal braces 62. Each boundary beam 20 has two ends, and inboard of each end is a perpendicular connection to one of the two ends end of an exterior spar 22. Thus, the four outer corners of the segment platform 18 are established only by the ends of the two boundary beams 20 while the inner corners of the segment platform 18 are formed at the intersection of the ends of exterior running spars 22 and the boundary beams 20. The boundary beams 20 and exterior running spars 22 are mechanically fastened together at the piling caps 16 as illustrated in FIGS. 4 and 5.

Figure 6:
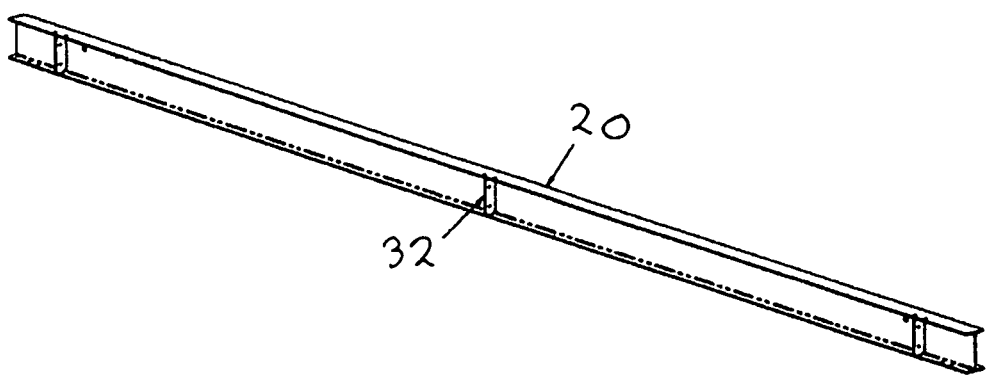
FIG. 6 is a perspective view of s boundary beam.

The boundary beams 20 are structural linear members preferably with a conventional I beam or wide flange configuration, although pipe, square tube sections or formed tapered beams may also be used. (FIG. 6) Inboard slightly of each end of the boundary beams 20 are affixed (preferably by welding) vertical support gusset plates 32 on the web 34 of the boundary beam 20 between its lower flange 26 and upper flange 38. (FIG. 7) The support gusset plates 32 have orifices formed there through for mechanical connection to the spars 22, 21 and 50. Note, that there is at least one additional support gusset plate 32 located between the two support gusset plates 32 adjacent to the ends of the boundary beam 20 for the connection of interior running spars 21.

Figure 8:
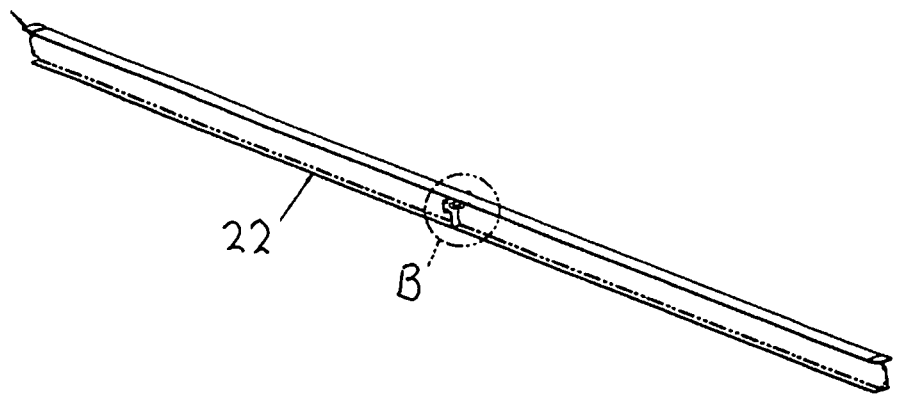
FIG. 8 is a perspective view of a running spar.

All running spars (interior or exterior) are substantially similar. The exterior running spars 22 and stiffening spars 50 may be made of the same cross-sectional dimensions and configuration of structural steel as the boundary beams 22. (Preferably though, the running spars 22 and 21 will have larger cross-sectional dimensions than the stiffening spars 50.) The running spars 22 and 21 have cutouts 40 on the lower section of their ends (FIG. 7) and extension tabs 42 that overhang at the ends of their top flange 44 (FIGS. 5 and 8). The extension tabs are preferably welded to the end of the spars 22 and 21 but have orifices in the overhanging region that matingly align with orifices formed through the top flange of the boundary beams 20 for mechanical connection.

Figure 11:
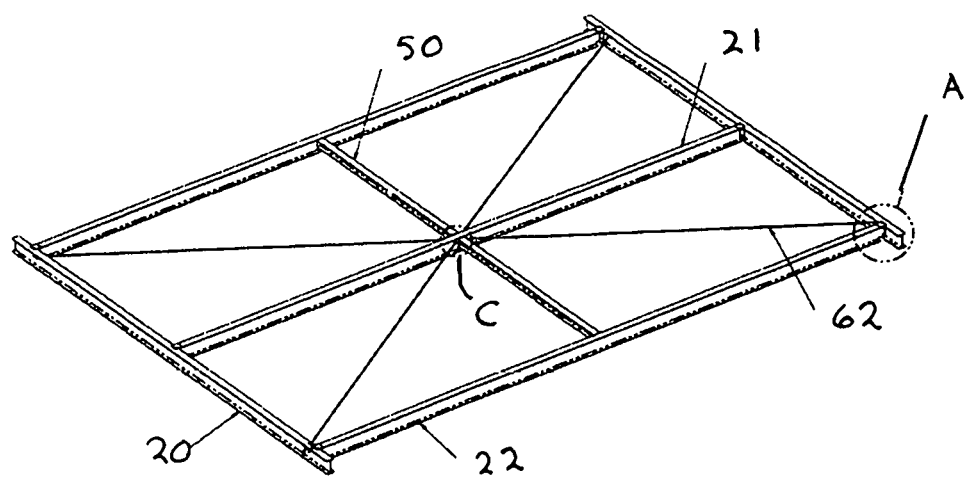
FIG. 11 is a perspective view of a segment platform.

All the running spars 22 and 21 also have a vertical central extended gusset plate 46 (FIG. 9) that is affixed to the running spar's web 48. This extended gusset plate 46 has orifices for the mechanical connection of shorter stiffening spars 50 and is deeper than the support gusset plates 32, extending beyond the edge of the top flange 44. (FIG. 11) Extending normally and horizontally from either side of the extended gusset plate 46 are brace tabs 66. These are planar segments having an angled edge that will face the corner of the segment platform 18. There is a threaded recess in the brace tab 66 formed perpendicular to the angled edge.

The stiffening spars 50 just have orifices formed at their ends through their web to allow the passage of mechanical fasteners that connect them to the extended gusset plates 46 on the external and internal spars 22 and 21.

Figure 7:
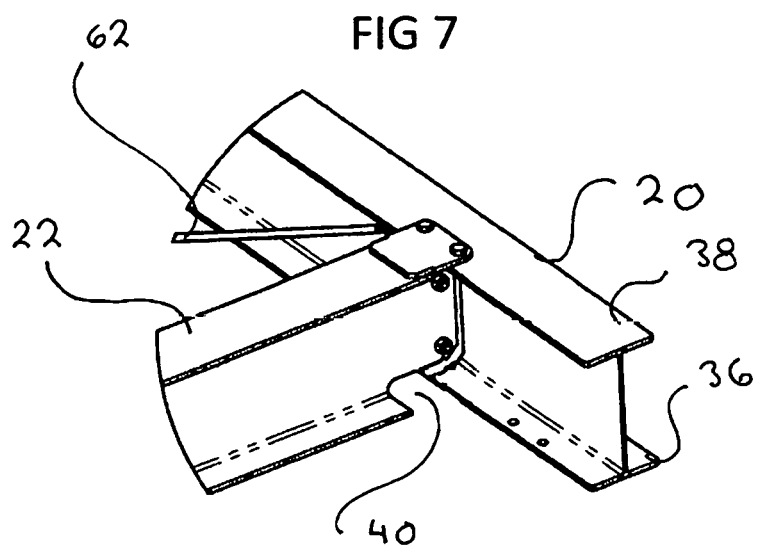
FIG. 7 is a top perspective view of a boundary beam connected to running spar.

The boundary beams, preferably are all the same length A and the running spars 22 and 21 are all each the same length B. Lengths A and B are not necessarily the same. The boundary beams 20 and the running spars 22 are connected adjacent the boundary beam's ends and along the boundary beam 20 as illustrated in FIGS. 4, 5, and 7. The boundary beams 20 have orifices formed through their top flanges that align with mechanical fasteners placed through the orifices in the extension tabs 42 on the ends of the running spars 22. The exterior and interior running spars 22 and 21 are connected to the support gusset plates 32 on the boundary beams 20 with mechanical fasteners passing through the orifices formed through the ends of the running spars 22.

Here, mechanical fasteners pass through orifices formed through the ends of the running spars 22 and the brace tabs 66.

The running spars 22 and 21 and the stiffening spars 50 are connected perpendicularly along or at midpoint the running spars 22 as illustrated in FIG. 10. Here, mechanical fasteners pass through orifices formed through the ends of the stiffening spars 50 and the brace tabs 66.

Figure 12:
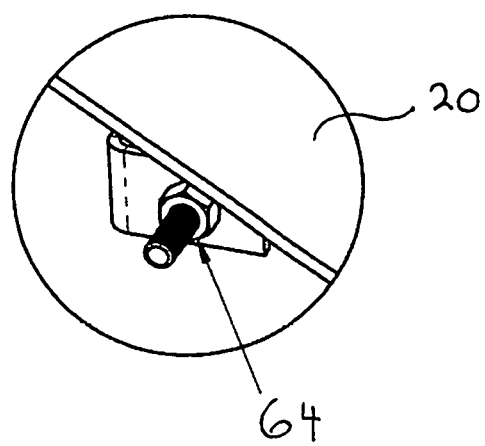
FIG. 12 is a perspective view of a brace and corner bracket.
Figure 9:
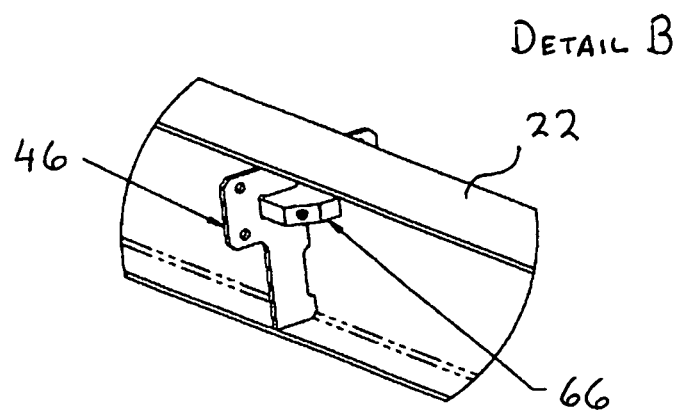
FIG. 9 is a is a perspective view of an extended gusset plate on a running spar.

For additional stiffening and to keep the segment platforms 16 from flexing into parallelograms under lateral wind loads upon the solar panel arrays, there are diagonal braces 62 running from the center of the segment platforms 16, (where the stiffening spars 50 are attached to the running spars 22) to the interior corner of the segment platforms 18 (where the running spars 22 are attached to the boundary beams 20). These braces 62 (FIGS. 4, 10 and 11) may be steel rods or cable incorporating tensioning methods well known in the industry such as turnbuckles (not illustrated). The braces 62 are affixed at the interior corners of the segment platforms 18 to corner brackets 64 on the boundary beams inboard of the exterior running spar connections (FIGS. 4 and 12) and at the center of the segment platforms 18 to the brace tabs 66 (FIGS. 9 and 10). If steel rods are used for braces 62 they may be tensioned by nuts torqued onto threaded ends of the rods that extend through orifices in the corner brackets 64 while the other end of the rods are threadingly engaged into the brace tabs 66.

Looking again at FIGS. 4 and 5, the piling caps 16 are horizontal flat steel plates 24 with tapered vertical piling inserts 26 extending normally from their bottom face. The piling caps 16 are mechanically affixed to the segment platform 24 at the bottom face of the bottom flange of the end s of the boundary beams. The piling inserts 26 are tapered for ease of installation and alignment into the hollow proximal ends 14 of the pilings 10. The steel plates 24 extend radially beyond the interface of the bottom face of the steel plate 24 and the top of the piling insert 26 so as to provide a surface for the piling caps to rest on the top edge of the pilings 10. There is a plethora of physical configurations that the piling inserts 26 may have from conical to tapered cylindrical crosses (which are the preferred embodiment and illustrated herein.) The top end of the piling inserts 26 will have an external diameter less than the internal diameter of the proximal end 14 of the pilings 10. In this way, the bottom face of the flat plates 24 of the piling caps 16 sit horizontally on the top horizontal edge of the pilings 10. Since the pilings 10 are substantially identical, are arranged at the four corners of the segment platform 24, and extend to an approximate 18 foot height above the general grade, the segment platform 24 resides in a horizontal orientation. (It is to be noted that the dimensional tolerances between the external diameter of the piling inserts 26 and the internal diameter of the proximal end 14 of pilings 10 will not be sized for frictional engagement as play is necessary for the simultaneous alignment/insertion of multiple piling caps 16 into the pilings 10.) The weight of the segment platform is supported on the pilings 10 by the piling caps 16.

Although the preferred method of attachment of the boundary beams 20 to the piling caps 16 is by bolting through orifices 28 in the boundary beam and slots 30 in the piling caps 16, equivalent mechanical fasteners may be used such as rivets, welds, pins, clevises and the like.

The structure 2 is additive, in that adjacent structures 2 may be coupled to the first erected structure 2 and sharing some of the pilings 10 and piling caps 16. For this reason, there is a vertical cross 58 extending from the approximate center of the top face of the flat plates 24 of the piling caps 16, segmenting the top face of the flat plates 24 into four separate quadrants 60 to accommodate the ends of four boundary beams 20. In each of the four quadrants 60 there is a beveled alignment tab 62 to guide the exterior corners of the segment platforms 18 of adjacent structures 2 onto the piling caps 16 for attachment to the pilings 10. Each piling cap 16 and piling 10 can accommodate the exterior corners of up to four segment platforms 18.

In the preferred embodiment, the segment platforms 18 are 35 feet by 45 feet or 40 feet by 50 feet and the pilings are approximately 43.5 feet long where they extend out of the ground for a finished height above grade of approximately 18 feet to the bottom of the spars and beams. A typical 1 megawatt electrical generation solar station will have 48 segment platforms.

Figure 3:
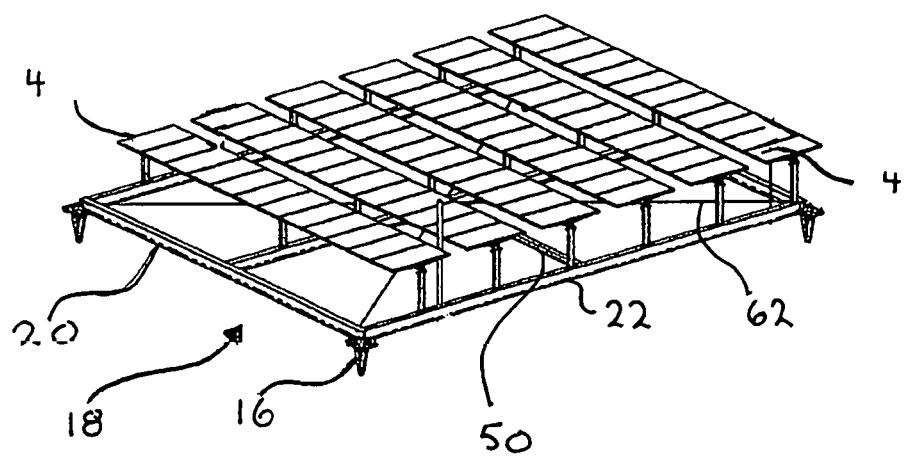
FIG. 3 is a perspective view of the photovoltaic solar panel array sitting atop the segment platform.
Figure 13:
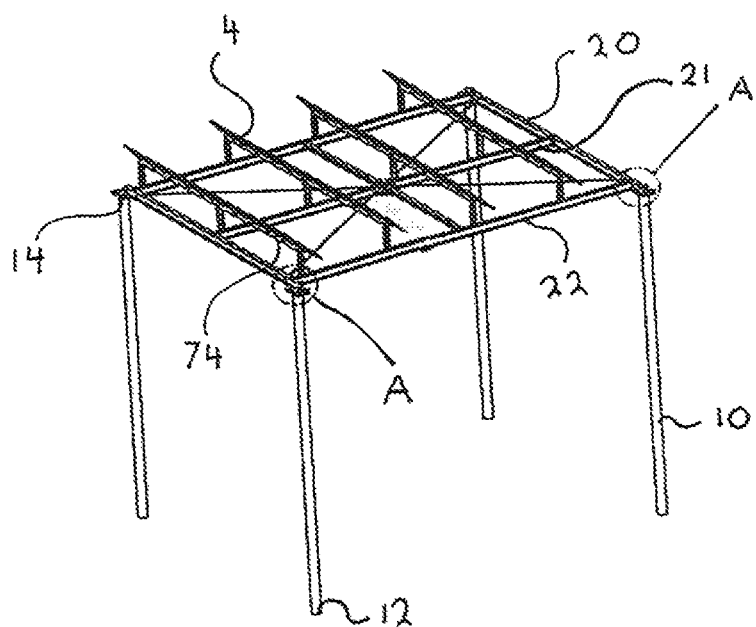
FIG. 13 is another perspective view of a structure with a solar panel array affixed thereto.
Figure 4:
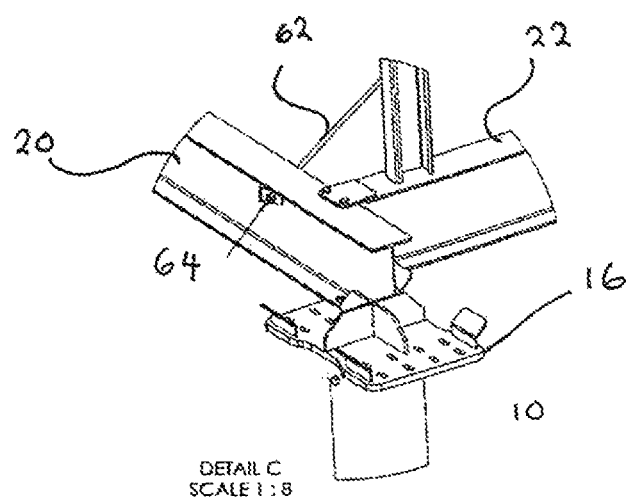
FIG. 4 is a perspective close up view of the outside corner of a segment platform.

Looking at FIGS. 3 and 13, the solar panel array 4 is made of a series of rows of substantially similar vertical posts 72 mechanically affixed onto the running spars 22 and having a linear member 74 rotateably connected across the top of each row of posts 72. The linear members 74 span the width of the segment platform 18. Onto each linear member there is a row of operationally connected solar panels 70. There are rotational motors mounted on the posts 72 that are operationally connected to the control system which rotate the linear members 74 to adjust the angle of the solar panels 70 based on tactile human input signals as well as signals received from environmental sensors. In the preferred embodiment, the adjustment of the angles of the solar panels 70 to produce the desired solar tracking and Counter-Tracking angles is controlled by computer-driven actuator(s) that directly or indirectly (through mechanical linkages) rotate the solar panels 70.

With the pilings 10 erected, the segment platforms 18 are assembled on the ground and the linear members 74 with rows of solar panels 70 with their control systems, wiring, and rotational motors are operationally mounted on the posts 72. The environmental sensors and control systems preferably are mounted on the running spars 22, the boundary beams 20 or the pilings 10. In this way, a segment platform 18 can be lifted by crane or other jacking system to above the structure 2 and the piling caps 16 connected with mechanical fasteners to the exterior corners of the segment platform 18 such that and the piling inserts 26 of the piling caps 16 may be lowered into the open top ends of the pilings 10 and the structure assembly completed.

The present invention advances the art of solar panel electricity generation by using already existing agricultural lands or other disadvantaged or restricted lands, coexisting with uses of these lands with minimal intrusion.

While certain features and aspects have been described with respect to exemplary embodiments, one skilled in the art will recognize that numerous modifications are possible. In the way of an example, the number of interior running spars may exceed one and the number of stiffening spars may exceed two as numerous segment interior geometric configurations may be utilized. The mass of the solar arrays supported and the overall size of the segment will dictate the number of additional interior supports that are needed. Various ground coverage ratios may be achieved by increasing the spacing between solar panel row. This could increase or decrease the number of rows of solar panels that are used in each segment. It will be appreciated that the invention is intended to cover all modifications and equivalents within the scope of the following claims.

Having thus described the invention, what is claimed as new and desired to be secured by Letters Patent is as follows:

1. A photovoltaic solar panel array support structure comprising:
   a series of vertical pilings, said pilings having a lower distal end and a hollow, upper proximal end;
   a planar, horizontal rectangular platform having exterior corners;
   at least one piling cap for each vertical piling, said piling caps affixed at said exterior corners, said piling cap comprising a flat plate having a top face and a bottom face;
   a tapered piling insert extending normally from each of said bottom faces of said piling caps; and
   a series of rows of vertical posts mechanically affixed onto said platform for the operational connection of said photovoltaic solar panel array;
   wherein said distal end of said pilings is anchored to the ground and said proximal end is hollow and extends a height above said ground; and
   wherein said piling insert is engaged into said hollow, upper proximal end of said piling such that said piling cap rests atop of said proximal end and supports said platform at an elevated position.

2. The photovoltaic solar panel array support structure of claim 1 wherein said planar, rectangular platform further comprises;
   a pair of equal length boundary beams, said boundary beams each having two beam ends;
   at least two equal length exterior running spars, said running spars each having two spar ends;
   wherein said boundary beams are arranged in a parallel configuration and said spar ends of said exterior running spars are affixed between said boundary beams, adjacent said beam ends.

3. The photovoltaic solar panel array support structure of claim 2 wherein said exterior running spars are affixed perpendicular to said boundary beams and wherein said vertical posts are located on at least one of said running spars.

4. The photovoltaic solar panel array support structure of claim 2 comprising at least one interior running spar substantially identical to said exterior running spars, said interior running spar affixed between said boundary beams, so as to reside parallel and between said exterior running spars.

5. The photovoltaic solar panel array support structure of claim 4 further comprising at least two stiffening spars, each having two ends, wherein said ends of said stiffening spars are affixed between said interior running spars and said exterior running spars.

6. The photovoltaic solar panel array support structure of claim 5 wherein said stiffening spars are parallel to said boundary beams.

7. The photovoltaic solar panel array support structure of claim 6 wherein said steel plates of said piling caps extend radially beyond said piling insert.

8. The photovoltaic solar panel array support structure of claim 4 wherein said interior running spar is affixed at the midpoints of said boundary beams.

9. The photovoltaic solar panel array support structure of claim 8 further comprising at least two vertical support gusset plates extending perpendicularly from each said boundary beam, wherein said exterior running spars connect to said boundary beams at said vertical support gusset plates.

10. The photovoltaic solar panel array support structure of claim 9 further comprising at least four vertical central extended gusset plates, with one vertical central extended gusset plate affixed to each exterior running spar and two vertical central extended gusset plates affixed to said interior running spar, wherein said stiffening spar ends are connected to said interior running spar and said exterior running spar on said vertical central extended gusset plates.

11. The photovoltaic solar panel array support structure of claim 10 wherein said vertical central extended gusset plate has brace tabs extending horizontally and perpendicular from said extended gusset plate.

12. The photovoltaic solar panel array support structure of claim 11 further comprising corner brackets extending from said boundary beams.

13. The photovoltaic solar panel array support structure of claim 11 further comprising a diagonal brace affixed between a corner bracket of said boundary beam and said extended gusset plate's brace tabs.

14. A photovoltaic solar panel array support structure comprising:
    at least four vertical pilings, said pilings comprising tubes having a distal end and a hollow proximal end, said distal end imbedded in the ground and said proximal end extending a height above said ground;
    at least two equal length parallel boundary beams, said boundary beams each having two beam ends;
    at least two equal length parallel, exterior running spars, said running spars each having two exterior spar ends;
    at least one interior running spar having two interior spar ends;
    at least two equal length stiffening spars having two stiffening spar ends;
    wherein said exterior spar ends are affixed perpendicularly between said boundary beams, adjacent said beam ends, and wherein said interior spar ends are affixed to said boundary beams at a midpoint between said exterior running spars, and said stiffening spar ends are connected perpendicularly between said interior running spar and said exterior running spars so as to form a planar rectangular platform,
    at least four piling caps, said each piling cap comprising a flat plate with a top face and a bottom face and a tapered piling insert extending perpendicularly from said bottom face and sized for engagement within said hollow proximal end of said piling, said flat plate extending radially beyond an interface of said piling insert and said flat plate bottom face; and
    a series of rows of vertical posts mechanically affixed onto said exterior and said interior running spars;
    a linear member rotateably connected across a top of said series of rows of posts, said linear member connecteable to said photovoltaic solar panel array;
    wherein said piling caps are attached to said platform at said ends of said boundary beams; and
    wherein said piling insert is engaged into said hollow proximal end of said piling such that said piling cap rests atop of said proximal end and supports said platform on said pilings.

* * * * *